Aug. 7, 1962 J. J. MELE 3,048,061
CERAMIC COATED BUSHINGS AND ALLIED PRODUCTS
Original Filed Dec. 15, 1958
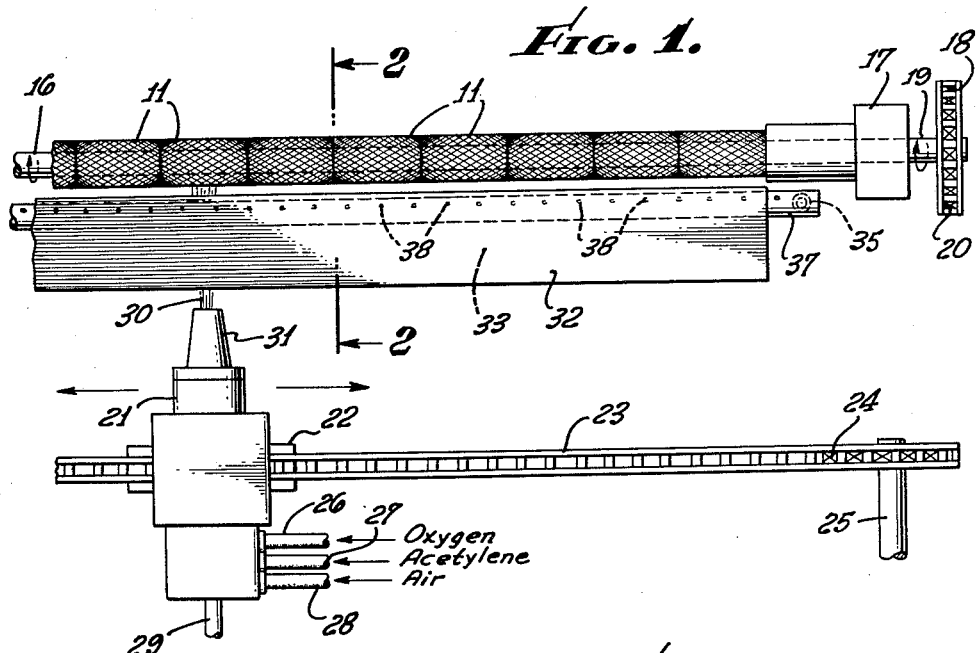
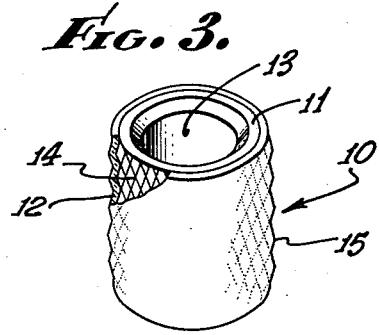
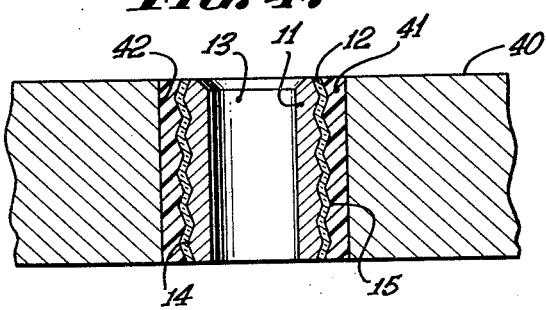
INVENTOR.
JOSEPH J. MELE
BY
Buehler & Shanahan
ATTORNEYS.

3,048,061
CERAMIC COATED BUSHINGS AND ALLIED PRODUCTS

Joseph J. Mele, North Bellmore, N.Y., assignor, by mesne assignments, to American Drill Bushing Co., a corporation of Maryland
Original application Dec. 15, 1958, Ser. No. 780,528. Divided and this application Jan. 9, 1961, Ser. No. 93,827
3 Claims. (Cl. 77—62)

This application is a division of application Serial No. 780,528, filed December 15, 1958.

The invention relates to drill bushings and has special reference to the preparation of drill bushings and related items coated with ceramic material in order to improve the performance of drill jigs and drill blocks when assembled with drill bushings.

Since the advent of types of drill bushings which are set in position in drill blocks by use of plastic, there has been a very marked improvement in the accuracy of drill blocks and in the ease with which drill blocks for use on a great variety of work pieces can be made. A limiting element, however, in the employment of drill bushings set in a potting resin has been the inability of the resin to withstand relatively high temperatures which often occur in regular manufacturing process as, for example, when the drill is carelessly used, when the drill bit is not properly sharpened, and also when materials are worked upon wherein the character of the metal or other material is one prone to overheat to a degree, either because of the character of the composition or the thickness of the material which is to be drilled. Potting plastics, although completely satisfactory at temperatures below 300° F., become soft at higher temperatures and permit the bushing which they encase to shift out of its precise alignment.

One of the seriously objectionable effects of a softening of the plastic lies in the fact that in a drill block, for example, containing a relatively large number of bushings so set in the plastic, one or a few of the bushings may become overheated and consequently misaligned without being noticed by the operator and in consequence as work continues to be done many complicated and expensively machined parts become rejects.

It is therefore among the objects of the invention to provide a drill bushing coated with a heat resistant coating which when assembled by potting in a drill block is of such character that heat generated in a bushing is prevented to a large degree from reaching the potting plastic, thereby to produce a drill block capable of being used under adverse conditions for a particularly long run of operating hours.

Another object of the invention is to provide a new and improved ceramic coated drill bushing wherein the coating is highly heat resistant and is applied to the exterior surface of the bushing in such fashion that it adheres uniformly and strongly to the surface of the bushing and moreover presents an exterior surface on the ceramic which is of a sufficiently roughened character and texture to improve the performance of the drill bushing when set in a drill block by means of a potting resin.

Still another object of the invention is to provide a new and improved drill block or drill jig wherein the bushing is highly resistant to detrimental effects of high temperatures by use of a multiple layer construction wherein a ceramic material surrounds and adheres to the drill bushing and a potting resin fills the remaining space between the ceramic material and the surrounding wall of a cavity or aperture in the drill block.

Also included among the objects of the invention is to produce a new and improved ceramic coated drill bushing and drill block made therefrom which has an especially long life, wherein failures are reduced to a relative minimum, which is productive of a relatively minimum degree of wear on drills used therewith and which furthermore substantially minimizes down time of machines and the amount of reworking of parts made thereby.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a schematic plan view of an apparatus by means of which drill bushings are coated with a ceramic coating.

FIGURE 2 is a cross-sectional view taken on the line 2—2 of FIGURE 1.

FIGURE 3 is a perspective view partially broken away showing one form of a drill bushing and appropriate ceramic coating.

FIGURE 4 is a longitudinal sectional view of a ceramic coated drill bushing affixed in a drill block by use of a potting material.

In an embodiment of the invention chosen for the purpose of illustration there is shown in FIGURE 3 a ceramic coated drill bushing 10 which consists of a metal bushing 11 and a layer of ceramic coating material 12. Extending through the bushing is a drill passage 13 and on the exterior of the bushing is a pattern 14 of configurations which in the present example comprise a series of diamond-like projections. It will be appreciated, however, that virtually any desired pattern may be employed which is productive of a sufficient amount of projections and depressions to provide a suitable grip when the resulting product is to be ultimately used. When employing the pattern 14 shown after application of the coating material, there will be a facsimile 15 of the pattern on the exterior of the coating material wherein the projections and depressions are reproduced but with more rounded edges and corners.

In order to produce the coated bushing above made reference to, special processing needs to be followed. After the drill bushing has initially been formed in the customary accepted fashion, it must be thoroughly cleaned and degreased. Degreasing may be followed by application of a black oxide finish or by sandblasting in order to prepare an adequate surface to which the ceramic coating will ultimately adhere in a satisfactory fashion. The treatment, moreover, must be entirely confined to the exterior surface so as to in no way affect the character of the surface of the drill passage 13 through the bushing.

After these operations have been completed, a series of the bushings 11 are placed upon a rod 16. The rod is one mounted in appropriate bearing fixtures 17, one of which is illustrated by way of example in FIGURE 1. A sprocket 18 is non-rotatably fixed to an end 19 of the rod in position to be engaged by a chain 20 driven from an appropriate conventional power source in order to rotate the rod 16 at a desired rate of rotation.

For applying the coating, use is made of a flame spray nozzle 21 of accepted design mounted upon a carriage 22 which travels upon a chain 23 which in turn travels over sprockets 24 driven by shafts 25, one of which is illustrated by way of example in FIGURE 1. Inasmuch as the drive mechanism is of any substantially conventional design, it will be understood that the drive should be one adapted to move the nozzle 21 to and fro in a horizontal direction from one end to the other of the rod 16, whereby to reach all of the bushings 11 in turn which are mounted thereon.

The nozzle 21 is of a known design commercially available supplied by conduits 26, 27 and 28 adapted to carry into the nozzle respectively oxygen, acetylene and air in appropriately regulated quantities whereby to provide the means of melting and driving material from a rod 29 of ceramic material in such fashion that the material emerges in a spray 30 from a tip 31 of the nozzle.

The spraying technique commonly known as flame spraying is one adapted to melt a material such as alumina ($Al_2O_3$) and zirconia ($Z_rO_2$) and other appropriate ceramic substances, so that the ceramic material is completely molten when it emerges as a spray from the nozzle tip, whereby it can be directed against the previously prepared surface of the bushings.

In addition to properly adjusting the size and form of the spray 30 as it emerges from the nozzle tip so that it will impinge upon the adjacent surface of the drill bushings, there is provided a deflector 32 which forms a progressively diminishing deflector passage 33 therein throughout the entire length of the rod 16. It will be apparent that as the nozzle 21 travels in a reciprocating direction from one end to the other of the rod 16 and the deflector 32 and reverses direction along the same path of travel as frequently as needed, the molten ceramic material will be passed through a deflector passage and emerge close to the adjacent surface of the drill bushings where it will impinge upon and adhere to the surface of the bushings.

In view of the necessity of raising the ceramic material to a temperature sufficient to melt it which may be well in excess of 3000° F., it will be understood that the temperature of the bushing material which is usually a steel alloy must be maintained far below that temperature in order that the alloy will not be damaged during the spraying operation. To accomplish this the rod 16 is rotated continuously so that there is substantial movement of the surfaces of the bushings while the spray is impinging upon them. The rate of movement should be sufficiently rapid so that there is no dwell long enough to permit heat to build up.

Because, however, of the exceptionally high temperature differential between that of the molten spray and the temperature above which the bushing must not be heated, additional means is provided in order to prevent accumulation of heat at any one point, especially where drill bushings of relatively small size and thin walls are to be coated. Accordingly, the nozzle 21 is kept in constant motion to and fro throughout the entire accumulated loading of the bushings 11 on the rod 16 while the rod is turning. In this manner the coating is gradually built up on the surface of the drill bushings to the desired thickness in a gradual fashion and at a temperature which will not be damaging to the material of the bushings.

To further insure against the concentration of heat at a damaging level, there is provided an air cooling system consisting of columns 35, one of which is illustrated in FIGURE 2 mounted upon a suitable support 36, at the top of which is a pipe 37 connected thereto, the pipe 37 extending throughout the entire length of the rod 16. Apertures 38 spaced one from another throughout the length of the pipe are directed toward the bushings on the rod 16 so that they are bathed in a mass of cooling air or other appropriate gas throughout the entire coating operation.

It will be understood from the foregoing description that the bushings must be slid freely upon the rod 16 so that they can be readily placed thereon and moved therefrom after coating but must have a sufficiently snug fit upon the rod to insure the bushings being constantly and uniformly rotated during the spraying operation as the rod is rotated. The amount of build up of ceramic material on the surface can be controlled by the length of time of the coating operation and, where temperature permits, by the speed of rotation of the rod 16 and the rate of travel of the nozzle 21, within limits set by the necessary amount of cooling. Effective thicknesses of the coating material have been found to range somewhat widely between approximately .010 inch and .050 inch, depending to a large degree upon the size of the bushing which is coated and the pattern of configuration on the exterior of the bushing. In the interest of good performance it is desirable that the coating be no thicker than that necessary to provide a sufficient obstruction to the flow of heat from the bushing to the exterior of the coating, whereby the amount of material forming the coating can be kept to a minimum and the outside diameter of the coated bushing can also be kept to a minimum.

When the coated bushing is to be used, it is potted in a drill block 40 of conventional kind by use of a potting resin 41. The usual manner of setting drill bushings in a drill block like the block 40 is to drill a hole 42 in the block approximately one-quarter of an inch greater in diameter than the outside diameter of the coated bushing, after which the bushing is placed within the hole where it is held by a properly located pin, not shown, whereafter the potting resin 41 is poured into the remaining annular space between the exterior surface of the coated drill bushing and the wall of the hole 42. A sufficient length of time is allowed for the potting material to thoroughly set.

The coated drill bushing is securely held by the potting resin especially where the exterior surface of the coating is of a texture and form such as that described herein whereby the bushing once assembled will not easily be pushed out of its setting under the adverse conditions provided against by the apparatus herein described.

In use even though temperatures generated in the drill bushing by dull drill bits and friction may reach from 700° F. to 900° F. and on some occasions higher, the ceramic coating will act as a dam whereby to prevent passage of heat at these high temperatures to the potting resin and hence the resin will not soften and will continue to retain the coated drill bushing in its proper position without deviation for exceptionally long periods of use.

It will further be understood that by providing effectively ceramic coated bushings wherein the ceramic coating is suitably bonded to the entire exterior roughened surface of the drill bushing, the drill block formed with the coated bushings can make use of already standardized procedures and the highly efficient coated bushing and assembly thereof described in the foregoing disclosure can be introduced into already well-known procedures making available to shops and establishments already using potted drill bushing techniques the extremely long life of the coated drill bushing without substantial change or deviation from other established techniques.

Moreover, by providing a relatively thin ceramic coating upon the drill bushing, the outside diameter of the coated bushing is only slightly greater than the outside diameter of the bushing itself and hence the diameter of the holes 42 can be kept small and permit bushings to be located close together in a drill block where close set holes are necessary.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent products.

Having described my invention, what I claim as new and desire to secure by Letters Patent is:

1. A drill bushing comprising an inside generally cylindrical metal bushing having a drill passage therethrough and opposed circular end surfaces defining the end openings of the drill passage, said metal bushing having a circumferentially continuous side wall extending to and between said end surfaces and having a pattern of configurations on the exterior surface of said side wall, and a coating of ceramic material completely enveloping said exterior side surface, said coating being flame sprayed on said exterior surface and having on the outside area of the coating a modified replica of the exterior surface of the metal bushing wherein configurations are rounded to a greater degree than on said exterior surface and said end surfaces being uncoated.

2. A drill jig comprising a drill block having holes therein at drilling locations, a drill bushing having a drill passage therethrough, a coating of ceramic material completely enveloping the exterior side surface of the bushing, said coating being flame sprayed on the surface, and a potting plastic material filling the space between said outside area and the inside surface of holes in the block and adhesively bonded thereto whereby to set the bushing in the block.

3. A drill jig comprising a drill block having holes therein at drilling locations, a drill bushing having a drill passage therethrough, a pattern of configurations on the exterior surface of the bushing having a roughened texture, a coating of ceramic material completely enveloping said exterior surface, said coating being flame sprayed on the surface and having on the outside area of the coating a modified replica of the exterior surface of the bushing wherein configurations are rounded to a greater degree than on said exterior surface, and a potting synthetic plastic material filling the space between said outside area and the inside surface of holes in the block and adhesively bonded thereto whereby to set the bushing in the block.

References Cited in the file of this patent

UNITED STATES PATENTS

| | | |
|---|---|---|
| 2,707,691 | Wheildon | May 3, 1955 |
| 2,843,646 | Conant | July 15, 1958 |